(12) United States Patent
Schumann

(10) Patent No.: US 6,257,377 B1
(45) Date of Patent: Jul. 10, 2001

(54) ELECTROMECHANICALLY ACTUATABLE BRAKE

(75) Inventor: Frank Schumann, Bonnigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,961

(22) PCT Filed: Oct. 1, 1997

(86) PCT No.: PCT/DE97/02258

§ 371 Date: Jun. 14, 1999

§ 102(e) Date: Jun. 14, 1999

(87) PCT Pub. No.: WO98/27356

PCT Pub. Date: Jun. 25, 1998

(30) Foreign Application Priority Data

Dec. 16, 1996 (DE) .............................................. 196 52 229

(51) Int. Cl.$^7$ ............................ F16D 55/08; F16D 65/36; B60L 7/00

(52) U.S. Cl. ........................ 188/72.8; 188/156; 188/161; 188/162

(58) Field of Search ..................................... 188/156, 158, 188/72.8, 161, 162, 171

(56) References Cited

FOREIGN PATENT DOCUMENTS 2 190 441   11/1987   (GB) .

*Primary Examiner*—J. J. Swann
*Assistant Examiner*—David Divine
(74) *Attorney, Agent, or Firm*—Ronald E. Greigg; Edwin E. Greigg

(57) ABSTRACT

An electromechanically actuatable brake, in which a brake lining is pressed by an electric motor against a brake disk via a threaded roller drive. To enable releasing the brake in the event of a malfunction, a nut of the threaded roller drive is braced axially via a self-locking-free spindle, which is blocked against relative rotation by a permanent magnet brake, the permanent magnet brake is releasable by supplying current to the permanent magnet brake. When the permanent magnet brake is releasable by having current supplied to it, the brake lining pressed against the brake disk sets the spindle, forming the bracing means, into rotation and presses the entire threaded roller drive away from the brake disk and as a result the brake is released.

9 Claims, 1 Drawing Sheet

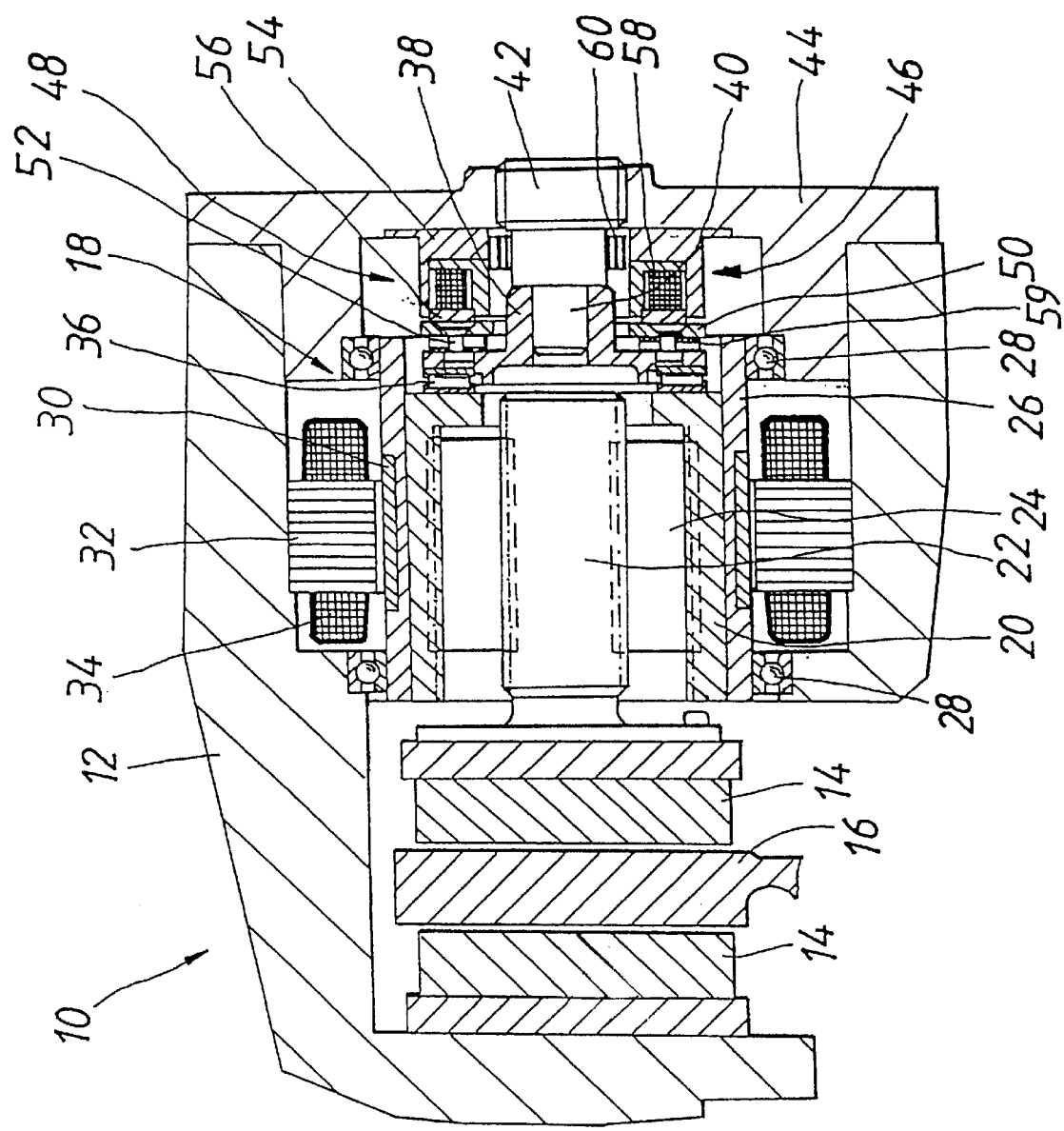

ELECTROMECHANICALLY ACTUATABLE BRAKE

CROSS-REFERENCES TO RELATED APPLICATIONS

This application is a 371 of application PCT/DE97/02258 filed Oct. 1, 1997.

BACKGROUND OF THE INVENTION

The invention relates to an electromechanically actuatable brake.

From British Patent GB 2 190 441, one such electromechanically actuatable brake is known with a two-part actuating device, namely a first part for overcoming the air clearance and a second part for pressing a brake lining against a brake body. Both parts of the actuating device have a separate spindle drive, drivable by its own electric actuating motor. The two parts of the actuating device can be driven simultaneously or successively to execute a brake actuation, by putting the two motors into operation. Both parts of the actuating device are joined together by a blocking bracing means embodied as a pair of levers. The pair of levers is pivotably supported about a stationary shaft. The first part of the actuating device engages the pair of levers with slight spacing from the shaft, while the second part of the actuating device engages the pair of levers with major spacing from the shaft. Because of this arrangement, the first part of the actuating device, which acts directly on the brake lining, is capable of rapidly overcoming the air clearance; via the pair of levers and the first part of the actuating device, the second part of the actuating device can generate a high contact-pressure force on the brake lining. Both motors of the actuating device can be equipped with a brake. Thus, unintended adjustment of the brake during braking operations can be avoided with a constant braking force while the motors are turned off.

The known brake is intended particularly for use in railroad vehicles. There the requisite installation space for the two parts of the actuating device and the relatively large-volume for the pair of levers is available in the known brake device. But because of its weight and volume, the brake would be unsuited to disposition in the bowl of a wheel rim of a road vehicle. Moreover, because of the two motors, the brake is expensive and requires increased expense for control. Thus, the bracing means is blocked only when, in successive drive of the two parts of the actuating device, the part serving to press the brake lining is not driven, or in other words only whenever only the air clearance is overcome. If both parts of the actuating device are driven simultaneously, conversely, the bracing means is not blocked. The bracing means can be released by swiveling the pair of levers about the fixed shaft. Pivoting the pair of levers is done by driving the motor of the part of the actuating device used to press the brake lining. If one or both motors of the actuating device fail, problems can arise in releasing the actuating brake.

From GB 2 190 441, a brake is also known for pressing a brake lining against a rotating brake body (brake disk, brake disk or the like), which has an actuating device with a threaded roller drive, which is drivable by an electric motor. Both tightening and releasing the known brake are accomplished with the electric motor. To prevent residual braking moments caused by hysteresis of the actuating unit from acting on the brake body in the event of a malfunction, such as failure of an electronic control system of the brake during braking, a preferably spiral restoring spring is provided in one embodiment of the known brake; this spring engages the actuating unit and drives the actuating unit, together with the electric motor, to rotate in the release direction so that the brake lining is lifted from the brake body.

This brake has the disadvantage that when brake pressure is built up, the force of the restoring spring must additionally be overcome, and the electric motor must therefore be dimensioned correspondingly larger and supplied with a higher current. In addition, there is a dynamic loss, and a loss of efficiency.

Another disadvantage is that to keep a built-up brake force constant, the electric motor must be supplied with such a high current that it keeps the brake lining pressed against the brake body with a constant contact pressure, counter to the force of the restoring spring, which entails thermal problems. Another factor is that the known brake cannot be used as a parking brake, because it releases when it has no current. Another disadvantage is that the brake cannot be released if the threaded roller drive is jammed.

Another disadvantage is that an air clearance, that is, a spacing between the brake lining and the brake body when the brake is released, increases with increasing wear of the brake linings. As a result, on the one hand a positioning travel of the brake lining until the brake lining contacts the brake body becomes greater and accordingly it takes longer until the brake grabs. The dynamic loss is additionally increased. Furthermore, the force necessary to overcome the force of the restoring spring increases, because the restoring spring is deformed more markedly. The energy that has to be brought to bear by the electric motor of the actuating device to deform the restoring spring is equivalent to the product of the deformation travel and deformation force; thus as the air clearance increases, this energy increases at least quadratically, which quite severely worsens the efficiency of the brake when the brake linings become worn.

ADVANTAGES OF THE INVENTION

The electromechanically actuatable brake of the invention as defined by the characteristics of claim 1 has a bracing means that is releasable by rotation and is blocked against rotation by an anti-jam device. For instance, the bracing means can be embodied on the order of a bayonet mount, which can be released by turning the mount by a small angle and displacing the mount axially away from the brake body. Another option is a bracing means that has a screw thread, which can be moved away from the brake body by turning the bracing means and is blocked against rotation by the anti-jam device. Thus, a screw thread that extends over less than one full revolution can be adequate.

The actuating device is braced against the bracing means when the brake is actuated, or in other words for pressing the brake lining against the brake body. In braking and when the brake is released, the bracing means acts as a fixed abutment for the actuating device but otherwise has no function. The brake is actuated and released with the actuating device. Thus the bracing means affects neither the actuating device itself nor its efficiency.

If in a malfunction, for instance a failure of the current supply to the electric motor or a failure of its electronic control system, or if a spindle drive of the actuating device jams or becomes hard to move, the brake cannot be released with the actuating device, then the blocking of the bracing means is released, making the bracing means freely rotatable. The rotation of the bracing means can be done by a reaction force, with which the brake lining, pressed against the brake body, acts on the actuating device, if the bracing means is embodied as a self-locking device. The rotation of the bracing means can also be done by means of a prestressed spring element, which rotates the bracing means in the release direction when the anti-jam device is released. With the release, the bracing means moves away from the brake body, or if the bracing means is embodied like a bayonet mount, the bracing means is displaceable freely away from the brake body, so that the actuating device together with the brake lining is also released from the brake body; in other words, the bracing means acting as an abutment for the actuating device is removed or at least its distance from the brake body is increased. The invention has the advantage that its bracing means neither affects the function of the actuating device nor worsens its efficiency.

By the provision of a prestressed spring element, which rotates the bracing means when the anti-jam device is released and thus releases the bracing means, the brake linings are lifted from the brake body. A residual braking moment is prevented from acting in the event of a malfunction, and the complete release of the brake is assured. This improves the proformance of a vehicle equipped with the brake of the invention during a malfunction. The brake of the invention can also be used as a parking brake, which maintains braking moment without being supplied with current. The brake of the invention has the advantage of optimally utilizing the energy stored in the brake because of the structural design of its releasable bracing means. The screw thread thereof is designed for optimal reverse torque; that is, the tightening force of the brake, in the event of a malfunction, is automatically reduced to zero when the brake is released. As a result, fewer structural components for releasing the brake in a malfunction are needed, which has advantages with respect to installation space, weight, costs, and power electronics.

Advantageous features and refinements of the invention defined are the subject of the invention.

BRIEF SUMMARY OF THE DRAWING

The invention is described in further detail below in terms of an exemplary embodiment shown in the drawing. The sole FIGURE of the drawing is a section through a brake of the invention.

DESCRIPTION OF THE EXEMPLARY EMBODIMENT

The brake of the invention shown in the drawing is embodied as a disk brake 10 with a so-called floating or sliding caliper 12, in which two brake linings 14 are disposed, one on each side of a brake disk 16 rotatable between them.

As the actuating device, the disk brake 10 has a spindle drive, specifically, because of its good efficiency, a threaded roller drive 18. A spindle drive has the advantage that an always-constant air clearance can be established between the brake linings 14 and the brake disk 16, regardless of wear of the brake linings 14. This has the advantage that a positioning distance and a positioning time until the brake linings 14, upon actuation of the disk brake 10, come to contact the brake disk 16 do not get any longer even when the brake linings 14 become worn.

The threaded roller drive 18 includes a nut 20, which coaxially surrounds a spindle 22. In a cylindrical interstice between the nut 20 and the spindle 22, threaded rollers 24 are distributed over the circumference, whose threads engage both the nut thread and the spindle thread. When the nut 20 is driven to rotate, the rollers 24 orbit the spindle 22 like the planet wheels of a planetary gear and cause an axial motion of the spindle 22. One of the two brake linings 14 is disposed, in a manner fixed against relative rotation, on one face end of the spindle 22 and can be pressed against one side of the brake disk 16 in order to bring a braking force to bear by driving the nut 20 to rotate. The other one of the two brake linings 14 is pressed in the process, in a known manner, against the other side of the brake disk 16 by the reaction force of the brake caliper 12. For releasing the brake 10, the nut 20 of the threaded roller drive 18 is driven to rotate in the opposite direction.

For its rotational drive, the nut 20 has a polygonal profile in its outer circumference, onto which a polygonal cuff 26 whose inside has a complementary polygonal profile is thrust. By way of example, the polygonal profile can have a square cross section, whose corners are intersected by a concentric circle, as known from DIN 32712. A polygonal profile is especially suitable for connecting the nut 20 of the threaded roller drive 18 to the polygonal cuff 26 in a manner fixed against relative rotation; these elements are intended to be longitudinally displaceable relative to one another when loaded with a torque. The two polygonal profiles have a clearance fit from one another; that is, the nut 20 is axially displaceable relative to the polygonal cuff 26 and is connected to the polygonal cuff in a manner fixed against relative rotation. The polygonal cuff 26 is supported rotatably in the floating caliper 12 by two ball bearings 28.

Permanent magnets 34 are inserted into an outer circumference of the polygonal cuff 26; the polygonal cuff 26 forms a rotor of an electric actuating motor of the brake 10 of the invention. A stator that has lamination packets 32 and stator windings on the permanent magnets 34 surrounds the polygonal cuff 26 forming the rotor. The stator 32, 34 is inserted solidly into the floating caliper 12. By turning on the actuating motor 26, 30, 32, 34, the nut 20 of the threaded roller drive 18, which is connected in a manner fixed against relative rotation to the polygonal cuff 26 forming the rotor of the actuating motor, is set into rotation, and the spindle 26 is axially displaced thereby and the brake 10 of the invention is actuated or released, depending on the direction of the rotation, as described above.

In the axial direction, the nut 20 of the spindle drive 18 is braced via a needle bearing 36 against a disk-like flange hub 38, which is pressed in a manner that transmits both force and moment onto a tang 40 that is integral with a second spindle 42. The second spindle 42 is screwed into a female thread of a cap 44 secured onto the floating caliper 12; the cap forms the spindle nut for the second spindle 42. This spindle and spindle nut arrangement 42, 44 forms a bracing means, which is releasable by rotation, for the nut 20 of the threaded roller drive 18 of the actuating device. The bracing means 38, 42, 44 is free of anti-jamming because of the pitch of its screw thread and the diameter of its spindle 42.

The brake 10 of the invention has an anti-jam device 46, which blocks the bracing means 38, 42, 44 against rotating. As the anti-jam device, by way of example an electromagnetic spring pressure brake which is preferably closed when without current, or an indexable trip-free mechanism can be used. In the exemplary embodiment shown, the anti-jam device 46 includes a permanent magnet brake 48 with an armature disk 50, which is disposed on a side of the flange hub 38 remote from the threaded roller drive 18. Via bolts 52 inserted into the flange hub 38, the flange hub 38 and the armature disk 50 are joined together in a manner fixed against relative rotation. An annular permanent magnet 54, which is mounted solidly on an inside of the cap 44, attracts the armature disk 50 against a friction lining 56 in the form of an annular disk, which is inserted into the face end of the permanent magnet 54 toward the armature disk 50. In this way, the flange hub 38 forming the bracing means for the nut 20 of the threaded roller drive 18, is blocked against rotation; it forms an abutment against which the nut 20 of the threaded roller drive 18 is braced when the brake lining 14 is pressed against the brake disk 16.

An electromagnet 58 is inserted into the annular permanent magnet 54 of the permanent magnet brake 48. By being supplied with current, the electromagnet 58 builds up a magnetic field that is oriented counter to the magnetic field of the permanent magnet 54 and virtually cancels the latter magnetic field out. A prestressed diaphragm spring 59 in the form of an annular disk, placed between the flange hub 38 and the armature disk 50, by its tensile force lifts the armature disk 50 away from the friction lining 56, so that the permanent magnet brake 48 is released. The armature disk 50 and together with it, the flange hub 38 forming the bracing means become freely rotatable; that is, the blocking of the bracing means is undone. The electromagnet 58 is connected to a power supply that is independent of the power supply to the actuating motor 26, 30, 32, 34, so that release of the brake 10 will be assured even if the power supply of the actuating motor 26, 30, 32, 34 fails.

When the brake 10 is actuated, a contact pressure, with which the brake lining 14 mounted on the spindle 22 of the threaded roller drive 18 is pressed against the brake disk 16, exerts a reaction force on the nut 20 of the threaded roller drive 18 in the opposite direction, that is, away from the brake disk 16. When the permanent magnet brake 48 is released, this reaction force causes a rotation of the flange hub 38 together with the second spindle 42, which is pressed onto the flange hub 38 and is screwed, free of jamming, into the cap 44 of the floating caliper 12. The effect of this rotation is that the second spindle 42, and together with the second spindle the flange hub 38, as well as the nut 20 together with the threaded rollers 24 and the spindle 22 of the threaded roller drive 18 all move axially away from the brake disk 16, until the brake linings 14 are either free or contact the brake disk 16 with an only slight contact pressure which is not enough to move the second spindle 42 farther. This slight contact pressure brings about a slight and acceptable residual braking moment of the brake 10 of the invention. Thus even in the event of a malfunction, that is, failure of its actuating motor 26, 30, 32, 34 or jamming of the threaded roller drive 18, the brake 10 of the invention can be released by releasing the permanent magnet brake 48.

In order to lift the brake linings 14 from the brake disk 16 in the event of a malfunction so that no residual braking moment is operative at the brake 10, the brake may have a prestressed spring element, in the form of a leaf-spiral spring 60 or torsion spring, which surrounds the second spindle 42 and engages it and braces it against the cap 44. This prestressed spiral spring 48, after the release of the permanent magnet brake 48, rotates the second spindle 42 in such a way that the second spindle 42 moves together with the flange hub 38 away from the brake disk 16. Via the nut 20, the threaded rollers 24 and the spindle 22 of the threaded roller drive 18, the brake lining 14 is lifted away from the brake disk 16. In this embodiment of the invention, the second spindle 42 need not be free of jamming. The prestressed spring element furnishes the entire reverse torque for the releasable bracing means 38, 42. It compensates for fluctuations in reverse torque caused by fluctuations in the coefficient of friction, temperature factors, etc. Furthermore, it minimizes the reverse torque that holds the permanent magnet brake 48 closed, or in other words has a reinforcing effect.

The foregoing relates to a preferred exemplary embodiment of the invention, it being understood that other variants and embodiments thereof are possible within the spirit and scope of the invention, the latter being defined by the appended claims.

What is claimed is:

1. An electromechanically actuatable brake (10), comprising an actuating device (18) that has an electric actuating motor (26, 30, 32, 34) for a spindle drive (20, 22, 24), a bracing means (38, 42, 44) for bracing the spindle drive (20, 22, 24), and a magnetically releasable brake for releasing the bracing means (38, 42, 44), a movable brake lining (14) is pressed by said actuating device in order to bring a braking force to bear against a rotatable brake body (16) to be braked and the brake lining is lifted from the brake body to adjust an air clearance between the brake lining (14) and the brake disk (16), with the electric actuating motor (26, 30, 32, 34) of the brake (10), both the brake force is brought to bear and the air clearance is adjusted;

the bracing means (38, 42, 44) is supported coaxially with the spindle drive (20, 22, 24) of the actuating device (18) in the brake (10) and is released by rotation and axial displacement;

a rotatable nut (20) of the spindle drive (20, 22, 24) of the actuating device (18) is braced on the bracing means (38, 42, 44), when the brake lining (14) is pressed against the brake body (16);

in a properly functioning brake (10), the bracing means (38, 42, 44) is blocked by the magnetically releasable brake both when the braking force is being brought to bear and when the air clearance is being adjusted;

if the brake (10) is defective, the magnetically releasable brake allows a rotation and axial displacement of the bracing means (38, 42, 44) that are independent of the electric actuating motor (26, 30, 32, 34), so that the brake lining (14) can be released from the brake body (16).

2. The brake according to claim 1, in which the releasable bracing means (38, 42) has a spindle (42) and a spindle nut (44).

3. The brake according to claim 2, in which the bracing means (38, 42) is free of self-locking.

4. The brake according to claim 1, in which the brake (48) has a stable braking position.

5. The brake according to claim 1, in which the actuating device has a spindle drive (18), whose nut (20) is joined in a manner fixed against relative rotation and axially displaceably to a transmission element (26), which is driven to rotate by the actuating motor (26, 30, 32, 34).

6. The brake according to claim 5, in which the transmission element is a polygonal cuff (26) with an internal polygonal profile, which meshes in a manner fixed against relative rotation with a complementary external polygonal profile of the nut (20) of the spindle drive (18).

7. The brake according to claim 6, in which the polygonal cuff (26) forms a rotor of the actuating motor (26, 30, 32, 34).

8. An electromechanically actuatable brake (10), comprising an actuating device (18) that has an electric actuating motor (26, 30, 32, 34) for a spindle drive (20, 22, 24), a bracing means (38, 42, 44) for bracing the spindle drive (20, 22, 24), and a releasable anti-jam device (46) for the bracing means (38, 42, 44), a movable brake lining (14) is pressed in order to bring a braking force to bear against a rotatable brake body (16) to be braked and the brake lining is lifted from the brake body again to adjust an air clearance between the brake lining (14) and the brake disk (16), with the electric actuating motor (26, 30, 32, 34) of the brake (10), both the brake force is brought to bear and the air clearance is adjusted;

the bracing means (38, 42, 44) is supported coaxially with the spindle drive (20, 22, 24) of the actuating device (18) in the brake (10) and is released by rotation and axial displacement;

a rotatable nut (20) of the spindle drive (20, 22, 24) of the actuating device (18) is braced on the bracing means (38, 42, 44), at least when the brake lining (14) is pressed against the brake body (16);

in a properly functioning brake (10), the bracing means (38, 42, 44) is blocked by the anti-jam device (46) both when the braking force is being brought to bear and when the air clearance is being adjusted;

if the brake (10) is defective, the anti-jam device (46) allows a rotation and axial displacement of the bracing means (38, 42, 44) that are independent of the electric actuating motor (26, 30, 32, 34), so that the brake lining (14) can be released from the brake body (16), and the releasable bracing means (38, 42) has a prestressing spring element (60), which rotates the bracing means (38, 42) and thereby releases the bracing means when the anti-lock device (46) is released.

9. The brake according to claim 8, in which the spring element is a spiral spring (60) or torsion spring.

* * * * *